United States Patent
Meyer et al.

(10) Patent No.: US 11,801,652 B2
(45) Date of Patent: Oct. 31, 2023

(54) PRESS WITH SPINDLE DRIVE

(71) Applicant: Gebr. Schmidt Fabrik für Feinmechanik GmbH & Co. KG, St. Georgen (DE)

(72) Inventors: Andreas Leo Meyer, Furtwangen (DE); Thomas Neff, Villingen-Schwenningen (DE)

(73) Assignee: GEBR. SCHMIDT FABRIK FÜR FEINMECHANIK GMBH & CO.KG, St. Georgen (DE)

( * ) Notice: Subject to any disclaimer, the term of this patent is extended or adjusted under 35 U.S.C. 154(b) by 632 days.

(21) Appl. No.: 16/745,482

(22) Filed: Jan. 17, 2020

(65) Prior Publication Data

US 2020/0147914 A1     May 14, 2020

Related U.S. Application Data

(63) Continuation of application No. PCT/EP2018/069666, filed on Jul. 19, 2018.

(30) Foreign Application Priority Data

Jul. 19, 2017     (DE) ...................... 10 2017 116 271.2

(51) Int. Cl.
    *B30B 1/18*     (2006.01)
    *B30B 15/12*     (2006.01)
    (Continued)

(52) U.S. Cl.
    CPC ................ *B30B 1/18* (2013.01); *B30B 15/12* (2013.01); *B30B 15/281* (2013.01); *F16H 25/2021* (2013.01); *F16H 2025/2075* (2013.01)

(58) Field of Classification Search
    CPC ......... B30B 15/281; B30B 1/18; B30B 1/181; B30B 1/183; B30B 1/185; B30B 1/186;
    (Continued)

(56) References Cited

U.S. PATENT DOCUMENTS

| | | | |
|---|---|---|---|
| 2,701,478 A | 2/1955 | Riess | |
| 4,593,547 A * | 6/1986 | Heiberger | ............. B30B 15/281 72/17.2 |
| 6,453,761 B1 | 9/2002 | Babinski | |

FOREIGN PATENT DOCUMENTS

| | | | |
|---|---|---|---|
| DE | 10333416 B3 | 10/2004 | |
| DE | 102006036961 A1 * | 2/2008 | ............... F16D 7/08 |

(Continued)

OTHER PUBLICATIONS

International Search Report issued for the application PCT/EP2018/069666 dated Nov. 26, 2018.

(Continued)

*Primary Examiner* — Jimmy T Nguyen
*Assistant Examiner* — Smith Oberto Bapthelus
(74) *Attorney, Agent, or Firm* — REISING ETHINGTON, P.C.

(57) ABSTRACT

A spindle drive having a spindle, a spindle nut which is arranged on the spindle, a housing which surrounds the spindle nut, and an overload clutch which is arranged in the housing. The spindle nut and the housing are connected to one another via the overload clutch. The overload clutch is set up to disconnect the spindle nut from the housing in a torque-free manner if a defined overload torque which acts between the spindle nut and the housing is exceeded.

13 Claims, 7 Drawing Sheets

(51) Int. Cl.
*B30B 15/28* (2006.01)
*F16H 25/20* (2006.01)

(58) Field of Classification Search
CPC ........... B30B 1/22; B30B 15/12; B30B 15/14; B30B 15/142
USPC ........................................ 100/287, 289, 346
See application file for complete search history.

(56) References Cited

FOREIGN PATENT DOCUMENTS

| | | |
|---|---|---|
| DE | 102006036961 A1 | 2/2008 |
| DE | 202014103629 U1 | 10/2014 |
| WO | 20040113707 A1 | 12/2004 |
| WO | 20050016636 A1 | 2/2005 |
| WO | WO-2005016636 A1 * | 2/2005 ............... B30B 1/18 |

OTHER PUBLICATIONS

English translation of the International Preliminary Report on Patentability issued for the application PCT/EP2018/069666 dated Jan. 21, 2020.

* cited by examiner

PRESS WITH SPINDLE DRIVE

CROSS REFERENCE TO RELATED APPLICATIONS

This application is a continuation of international patent application PCT/EP2018/069666, filed on Jul. 19, 2018 designating the U.S., which international patent application has been published in German language and claims priority from German patent application DE 10 2017 116 271.2, filed on Jul. 19, 2017. The entire contents of these priority applications are incorporated herein by reference.

BACKGROUND OF THE INVENTION

This disclosure relates to a press, in particular an electric press, in which a spindle drive is used. Presses of this kind are used predominantly as joining presses. Spindle drives are used essentially to convert a rotary motion produced by a motor (generally an electric motor) into a linear motion, generating large forces. They have a spindle, which is often also referred to as a leadscrew, and a spindle nut mounted on the spindle. Depending on the configuration of the spindle drive, the spindle and the spindle nut are connected to one another via one or more threads, one or more ball or rolling bearings or a planetary mechanism and are accordingly capable of movement relative to one another.

In the case of trapezoidal leadscrews or sliding spindles, the spindle nut and the spindle each have at least one thread groove. Power transmission between the spindle and the spindle nut takes place directly via the flanks of the thread grooves in the form of sliding friction.

In the case of recirculating ballscrews, power transmission between the spindle and the spindle nut takes place via a multiplicity of balls, which roll between the spindle and the spindle nut.

In the case of roller screw drives, which form another known type of spindle drive, power transmission between the spindle and the spindle nut is accomplished with the aid of planetary rolling elements, which roll between the spindle and the spindle nut. Planetary rolling elements have a high stiffness and are suitable particularly for transmitting high axial forces.

To produce a linear movement with the aid of a spindle drive, there are fundamentally two possibilities for introducing the torque of the motor into the spindle system. In the simplest case, a connection in the form of coupling (flexible or rigid) is established between the motor shaft and the spindle. In this case, the spindle nut is secured against rotation, so that when the motor shaft and the spindle rotate it undergoes axial movement along the longitudinal axis of the spindle. The second possibility consists in introducing the torque of the motor not into the spindle but into the spindle nut. In this case, it is also possible to speak of a driven nut. In this case, the spindle must be provided with an anti-rotation safeguard and a radial bearing assembly in order to be able to bring about an axial movement of the spindle during the rotation of the spindle nut. In this case, therefore, the spindle does not undergo any rotation but performs the axial translational movement instead of the spindle nut.

Depending on the type of drive and the type of configuration, spindle drives can therefore be used to produce very high linear forces. This advantage is exploited in electric presses, in which a spindle drive is used to drive the press ram.

In such presses, but also in other machines in which spindle drives are used as part of highly dynamic systems with end-contact or collision travel, extremely high peak forces occur due to the mass moments of inertia of the motor and of the spindle system. These peak forces which occur in the case of end-contact or collision travel can destroy parts of the drive train. In order to limit such peak forces, overload clutches are frequently used, and these are also often referred to as safety clutches. In this case, a fundamental distinction is drawn between linear and rotary overload clutches.

Linear overload clutches are generally connected directly to the spindle system. In this context, the connection between the motor shaft and the spindle can be of rigid design. A linear clutch generally has two clutch parts which can move linearly relative to one another and which are connected to one another nonpositively by spring-loaded pressure or latching elements. The spring-loaded pressure or latching elements, which are spherical, conical or cylindrical, are rigidly connected to one clutch half. They press on a corresponding geometrical feature of the second clutch half. If a defined axial force is exceeded, the sprung pressure or latching elements are forced out of the geometrical features, as a result of which the overload clutch disengages and the transmission of the axial force is interrupted.

One significant disadvantage of linear overload clutches is the extremely large overall lengths and the fact that the disengagement stroke is limited. Another problem is that of bringing a disengaged linear clutch back into its initial state. For these reasons, linear overload clutches of this kind are not very suitable for the use intended in the present case in electric presses.

Rotary overload clutches, which are also referred to as torque clutches, have two clutch halves and are normally mounted between the motor shaft and the spindle of the spindle drive. Normally, torque clutches comprise two hub halves, which are connected nonpositively to one another. Spring-loaded latching elements in the form of balls, cones or cylinders transmit the forces via correspondingly designed shaped grooves. If a defined torque is exceeded, the sprung latching elements are forced out of the shaped grooves, as a result of which the torque clutch disengages and torque transmission is interrupted. The transmitted torque can be determined, on the one hand, by the spring preload and also by the design of the geometry of the latching elements and of the shaped grooves.

One significant advantage of torque clutches is that the motor can rotate onward as often as desired after disengagement. There is no restriction in this respect. However, there is the problem that, when the torque clutch is disengaged, the sensor system of the motor is in a different alignment with respect to the spindle. In this case, there is a need for additional technical expenditure in order to achieve a defined state between the motor sensor and the spindle position. This can be accomplished, for example, by means of a direct travel measurement system, which detects the travel of the spindle nut or of the spindle.

The disadvantage with torque clutches, however, is the fact that they can only be used to transmit torques but cannot be used to transmit any axial forces. When such torque clutches are used in combination with spindle drives, the spindle must necessarily be equipped with an axial bearing in order to ensure the disengagement function when the torque is exceeded. However, such technical solutions entail a very large installation space.

It is in any case difficult to combine rotary overload clutches of this kind with conventional spindle drives without this entailing an enormous space requirement. Particularly in the case of spindle drives with a driven spindle nut, it is virtually impossible to install commercially available rotary overload clutches between the motor and the spindle nut. In such cases, the motor generally has a hollow shaft, into which the spindle nut is inserted. There is hardly any space in this case for an overload clutch.

SUMMARY OF THE INVENTION

It is an object to provide a spindle drive which overcomes the above-mentioned disadvantages and is suitable, in particular, for use in electric presses or other equipment with end-contact or collision travel. Furthermore, it is an object to limit the peak forces which occur in the case of end-contact or collision travel without this requiring an enormous additional installation space in comparison with conventional spindle drives. It is likewise the intention thereby to ensure that the maximum linear force that can be transmitted by means of the spindle drive is not restricted or at least not significantly restricted.

According to an aspect, there is presented a press comprising a motor, a spindle drive having a spindle and a spindle nut which is arranged on the spindle, a housing which surrounds the spindle nut, and an overload clutch which is arranged in the housing. The motor is configured to drive the housing in rotation. The spindle nut and the housing are connected to one another via the overload clutch to allow a torque transmission from the housing via the overload clutch to the spindle nut if a defined overload torque acting between the spindle nut and the housing is not exceeded, and wherein the overload clutch is configured to disconnect the torque transmission if the defined overload torque acting between the spindle nut and the housing is exceeded.

The spindle drive preferably comprises a rotary overload clutch (torque clutch) which is integrated directly into the spindle drive. The spindle nut is preferably used as part of the clutch system of the overload clutch. A housing, which preferably surrounds both the spindle nut and the overload clutch, serves as a counterpart, which is connected to the spindle nut via the overload clutch. The spindle nut and the overload clutch are therefore accommodated in one and the same housing, which is arranged on the spindle together with the spindle nut and the overload clutch. This allows an extremely compact construction.

In normal operation, i.e. for as long as the defined overload torque has not been reached, the spindle nut and the housing, which are connected to one another via the overload clutch, rotate synchronously with respect to the spindle. In normal operation, therefore, there is no relative movement between the spindle nut and the housing. Such a relative movement takes place only when the defined overload torque that results in disengagement of the overload clutch is reached.

The spindle drive further comprises a motor (preferably an electric motor with a hollow shaft), which drives the housing in rotation.

The spindle nut is driven via the housing and the overload clutch. One advantage of this solution is, in particular, that the spindle itself does not undergo any rotation. The speed of translation in the case of a spindle drive with a driven nut is accordingly not limited by the "critical spindle speed of rotation".

According to a refinement, the motor comprises a rotationally driven hollow shaft, in which the housing is arranged and to which the housing is connected for conjoint rotation.

Thus, the housing of the spindle drive is used virtually as a component of the hollow shaft motor. Owing to the above-described compact construction, the housing and the overload clutch and spindle nut situated therein can therefore be accommodated immediately and directly in the hollow shaft of the motor. Despite the overload clutch, the space requirement is hardly any greater than with commercially available spindle drives with a driven spindle nut, in which the spindle nut is connected directly to the drive shaft of the motor and there is no overload clutch.

According to a further refinement, the spindle drive furthermore comprises a radial bearing for radially supporting the spindle nut in the housing and an axial bearing for axially supporting the spindle nut in the housing. The radial and the axial bearing can also be combined in a single bearing, which supports the spindle nut in the housing both in the axial direction, i.e. parallel to the longitudinal axis of the spindle, and in the radial direction. When such combined axial/radial bearings are used, at least two of these combined axial/radial bearings are preferably provided. In the current sense, this case too should be regarded as an embodiment with a radial bearing and an axial bearing.

The radial bearing allows relative movement between the housing and the spindle nut when the overload clutch disengages upon reaching the overload torque. The radial bearing can comprise one or more sliding bearings, for example. As an alternative, the radial bearing can also have one or more ball or rolling bearings.

The axial bearing has the task of transmitting the axial forces between the spindle nut and the housing. Without such an axial bearing, the transmission of large axial forces with the aid of the spindle drive would be virtually impossible since rotary overload clutches of the kind already mentioned at the outset are hardly suitable for transmitting large axial forces since they are generally suitable only for transmitting forces in the circumferential direction (azimuthal direction).

According to a further refinement, the overload clutch comprises a first clutch component, which is connected to the spindle nut for conjoint rotation therewith, a second clutch component, which is connected to the housing for conjoint rotation therewith, and a plurality of latching elements, which are arranged between the first and the second clutch component and which unlatch from a latched position through a movement relative to the first and/or the second clutch component when the overload torque is reached.

In the present case, a connection for conjoint rotation is interpreted to mean a connection between two components which does not allow the relative movement of the two components, at least in the circumferential direction. This can be implemented by a nonpositive, positive or materially integral connection. Depending on the type of connection between the two components, a relative movement in the longitudinal and/or radial direction may be possible under certain circumstances. A fixed connection between the two components which does not allow any relative movement (that is to say not even in the longitudinal or radial direction) is likewise regarded as a connection for conjoint rotation in the current sense.

According to a further refinement, the first clutch component, which is connected to the spindle nut for conjoint rotation therewith, comprises a first latching disk having a plurality of first grooves. The second clutch component, which is connected to the housing for conjoint rotation therewith, likewise comprises a second latching disk having a plurality of second grooves. According to this embodiment, the latching elements are each arranged in one of the first grooves or in one of the second grooves in the latched position.

The latching elements can be embodied as cylindrical or conical rolling elements, for example. However, the latching elements are preferably of spherical design, e.g. in the form of steel balls. The shape of the grooves provided in the two latching disks is matched to the shape of the latching elements. One possibility for controlling or setting the overload torque at which the overload clutch disengages is appropriate matching of the shape and size of the grooves provided in the two latching disks.

According to a further refinement, the same number of second grooves as first grooves but twice as many latching elements as first grooves are provided.

In other words, each latching element is arranged either in one of the first grooves, which are provided in the first latching disk, or in one of the second grooves, which are provided in the second latching disk, in the latched position of the overload clutch. Thus, the latching elements are not arranged simultaneously in a first and in a second groove but only in one groove of a latching disk, with the result that they are pressed onto the smooth surface of the respective other latching disk by means of their respective opposite side.

The fact that each latching element is arranged in only one groove has the following advantages: on the one hand, this allows a mechanically simple type of embodiment for the overload clutch. On the other hand, the disengagement stroke is thereby reduced. In the present case, the disengagement stroke is interpreted to mean the distance by which the two latching disks have to move away from one another to allow the latching elements to disengage from the grooves and hence for the overload clutch to disengage. This reduction of the disengagement stroke makes it possible to reduce the wear which occurs between the latching elements and the two latching disks. Moreover, it is thereby possible to dimension the disengagement force with narrow tolerances.

According to a further refinement, the first grooves and the second grooves are each of asymmetric configuration and each have mutually opposite groove flanks with a different slope.

This has the advantage, in particular, that different disengagement forces, that is to say different overload torques, can be defined for the two opposite directions of rotation. Thus, for example, a steeper groove flank, i.e. a steeper slope of the groove flank relative to the face of the respective latching disk, can be used to define a relatively large disengagement force and hence a large overload torque. Conversely, a shallower groove flank, i.e. a relatively shallow slope of the groove flank relative to the face of the respective latching disk, can be used to define a relatively small disengagement force and hence a small overload torque. Asymmetrically shaped grooves with groove flanks having different slopes thus make it possible to provide a larger overload torque in one direction of rotation of the spindle drive than in the opposite direction of rotation. In the case where a press is used, the groove flank acting in the direction of the pressing force can have a steeper slope than the groove flank acting in the direction of the return stroke.

In the above-mentioned embodiments, the second latching disk is preferably mounted resiliently in the housing in the axial direction, i.e. parallel to the longitudinal axis of the spindle. This resilient support presses the second latching disk against the latching elements and these, in turn, against the first latching disk. The first latching disk is preferably fixed in the longitudinal direction.

Thus, this resilient support counteracts disengagement of the overload clutch. The spring force of this resilient support is another possibility by means of which the overload torque can be defined.

It is preferable if not just one spring element but a multiplicity of spring elements is used for the resilient support of the second latching disk in the housing. The use of a plurality of spring elements ensures that the preloading force which is exerted on the latching elements is introduced uniformly. Tolerances of individual spring elements can thus be eliminated to the greatest possible extent.

According to a further refinement, the housing comprises a plurality of guide grooves, into each of which there engages a web, which is connected to the second latching disk and projects radially from the second latching disk, wherein the webs are each movable in the axial direction but fixed in the circumferential direction in the guide grooves.

These guide grooves provided in the housing thus act as a support for the second latching disk in the circumferential direction, thereby providing the connection for conjoint rotation between the housing and the second latching disk. The mobility of the second latching disk relative to the housing in the axial direction is required to ensure disengagement of the overload clutch counter to the spring preloading force mentioned when the overload torque is reached.

Instead of embodiment refinement of the overload clutch with two latching disks and latching elements arranged between them, it is also possible, as an alternative, for the overload clutch to be embodied in such a way that the second clutch component comprises a plurality of holders, in each of which one of the latching elements is resiliently mounted, and wherein the first clutch component comprises a plurality of grooves, into which the latching elements engage in the latched position.

In this alternative type of refinement of the overload clutch, bar-shaped latching elements are preferably provided which are movable by spring action in the radial direction, i.e. perpendicularly to the longitudinal axis of the spindle, relative to the holder mentioned. In contrast to the above-mentioned embodiment, the disengagement stroke thus does not take place parallel to the longitudinal axis of the spindle but perpendicularly to said axis.

In this refinement too, the grooves which are provided in the first clutch component can be adapted in shape, size and position, depending on the desired disengagement force or desired overload torque.

In this refinement, provision can furthermore be made for the first clutch component to be configured as a sleeve, which at least partially surrounds the spindle nut and is connected to the latter for conjoint rotation therewith. Thus, the radially movable latching elements then do not engage directly on the spindle nut but on a sleeve which is mounted on the spindle nut. The sleeve can be connected to the spindle nut by means of one or more fastening elements, for example. Other types of nonpositive, positive or materially integral connection between the sleeve and the spindle nut are also likewise conceivable.

For example, the herein presented spindle drive can be used in an electric press of the kind known from DE 103 33 416 B3. A press of this kind is preferably used as a joining press.

However, it is self-evident that the herein presented spindle drive can also be used in other types of press.

It is furthermore self-evident that the features mentioned above and those which will be explained below can be used not only in the respectively indicated combination but also in other combinations or in isolation without exceeding the scope of the present invention.

DESCRIPTION OF PREFERRED EMBODIMENTS

Figure 1:
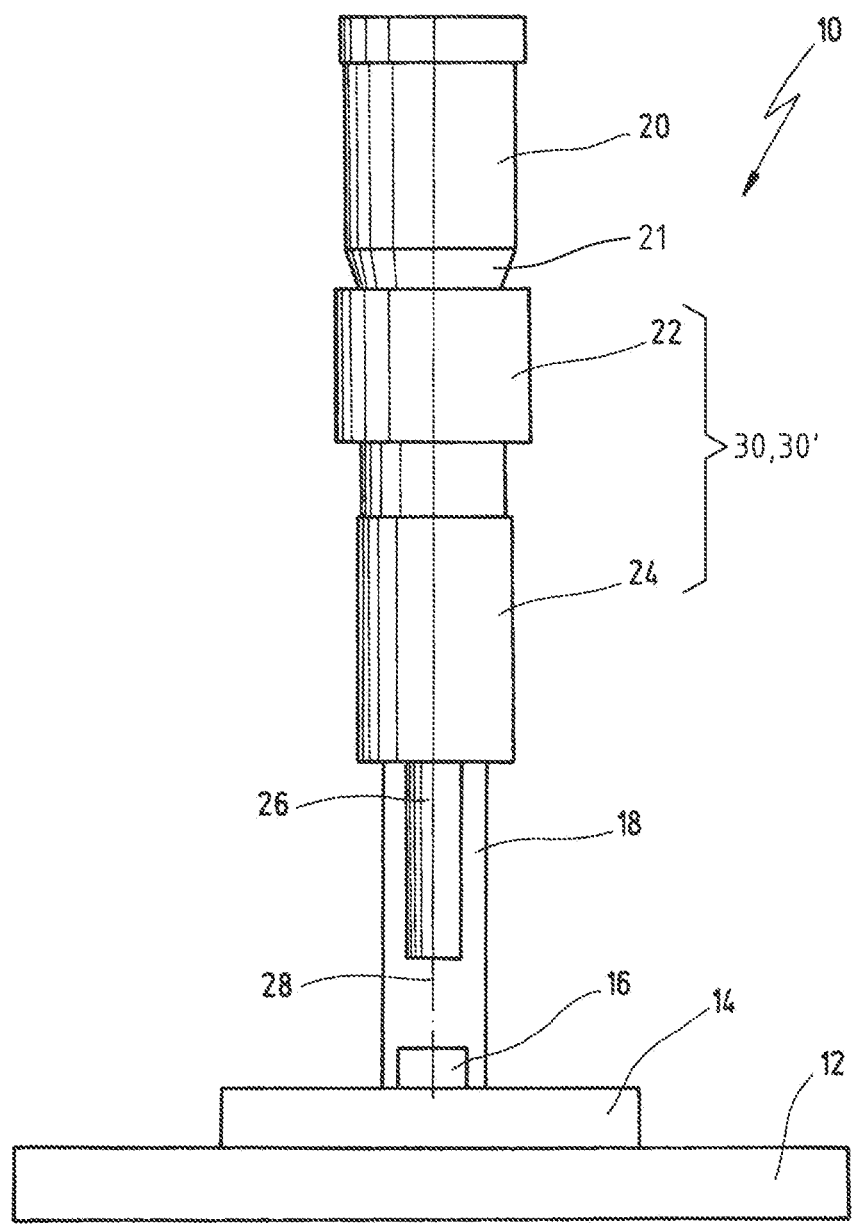
FIG. 1 shows a schematic illustration of an embodiment of an electric press.

FIG. 1 shows an exemplary embodiment of the herein presented press. In FIG. 1, the press is denoted in its entirety by the reference numeral 10. The press 10 can be implemented as an electric press in accordance with German Patent DE 103 33 416 B3, for example.

The press 10 has a base plate 12, on which a workpiece holder 14 with a workpiece 16 to be machined is situated. A column 18 projects outwards from the base plate 12. At the upper end of the column 18 is an electric drive motor 20 having a hollow shaft 21, below which is a housing 22, in which at least a part of a spindle drive can be accommodated, and below this is a spindle 24 of said spindle drive.

In FIG. 1, the spindle drive is denoted schematically by the reference numeral 30. The spindle drive 30 converts the rotary motion of the drive motor 20 into a translational motion of the spindle 24. A press ram 26, which projects downward, is attached to the spindle 24. Ultimately, this press ram 26 is moved toward and back away from the workpiece 16 in translation along a vertical axis 28 with the aid of the guide motor 20 and the spindle drive 30 in order to machine the workpiece 16. One possible form of machining that is typical for electric presses which are used as joining presses is the joining of the workpiece to other components.

Figure 2:
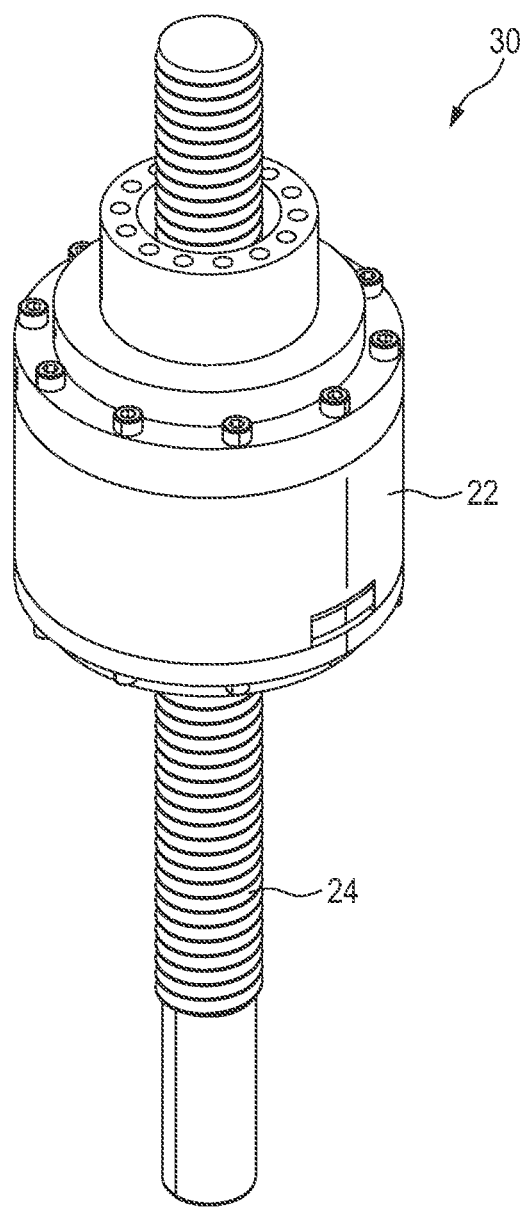
FIG. 2 shows a perspective illustration of a first embodiment of a spindle drive which may be used in the press illustrated in FIG. 1.
Figure 3:
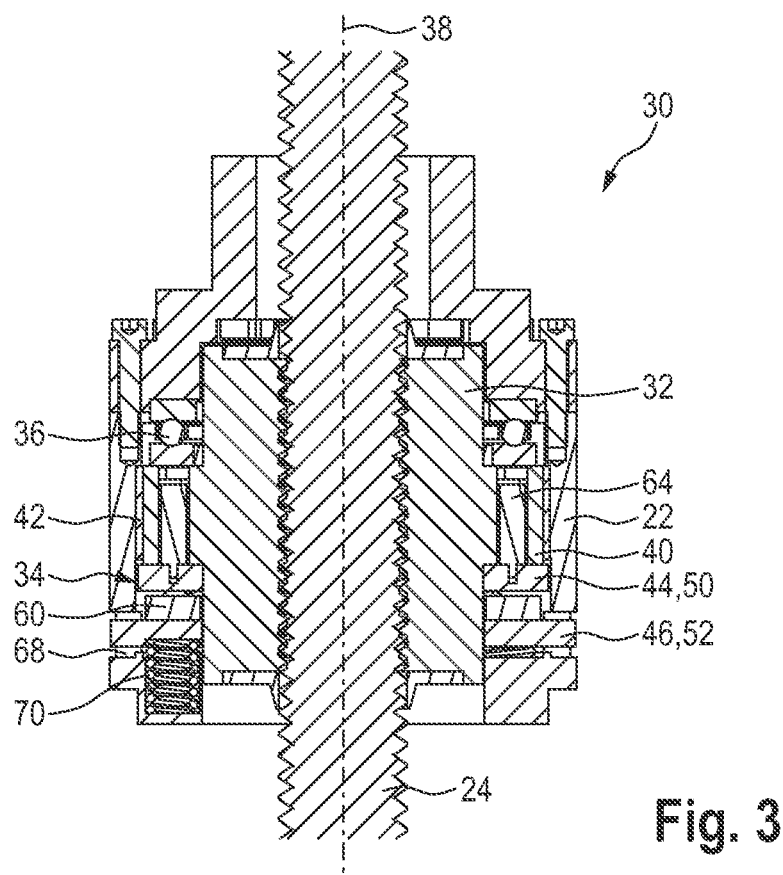
FIG. 3 shows a section through the spindle drive according to the first embodiment shown in FIG. 2.
Figure 4:
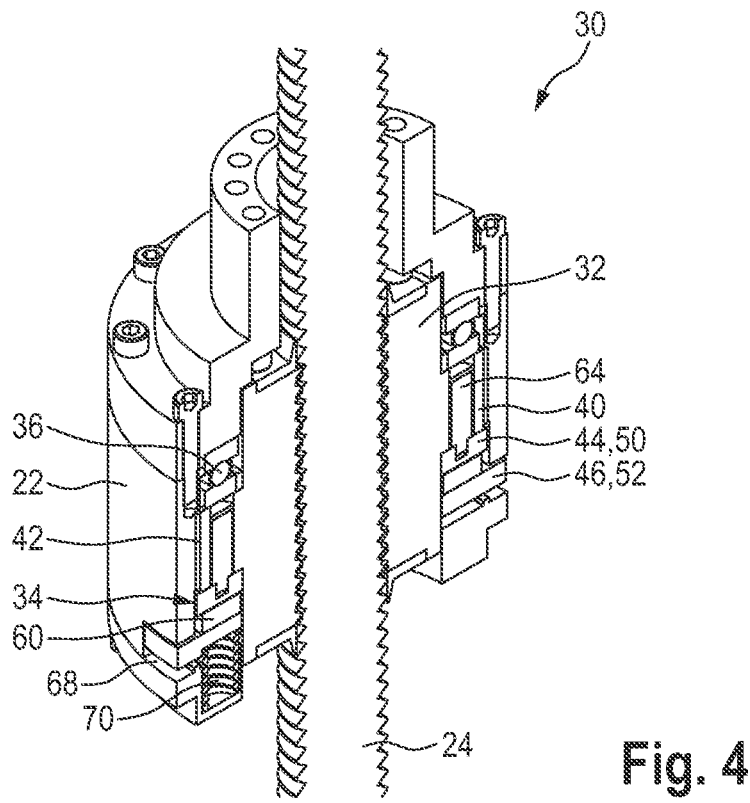
FIG. 4 shows a half-section through the spindle drive according to the first embodiment shown in FIG. 2.

FIG. 2 shows a first embodiment of the spindle drive 30 in a perspective illustration. Further sections and half-sections are shown in FIGS. 3 and 4.

In addition to the housing 22 and the spindle 24, the spindle drive furthermore comprises a spindle nut 32 mounted on the spindle 24. The illustrative embodiment of the spindle drive 30 in the present case is a spindle drive with a driven spindle nut 32. Accordingly, the spindle nut 32 is driven in rotation, thereby bringing about a purely translational motion of the spindle 24 (without rotation). To be able to ensure this, the spindle 24 is provided with an anti-rotation safeguard (not shown). The spindle nut 32 is driven indirectly in that the housing 22 is driven by the drive motor 20. The housing 22 is therefore connected in a fixed manner to the drive shaft of the drive motor 20. The drive motor 20 is preferably designed as a hollow shaft motor, and therefore the housing 22 is inserted partially or entirely into the hollow shaft 21 of the drive motor 20 and is connected thereto (nonpositively, positively or in a materially integral way) for conjoint rotation therewith.

The housing 22 is connected to the spindle nut 32 via an overload clutch 34. Parts of this overload clutch 34 are shown in detail in FIGS. 5-7. The overload clutch 34 is set up to disconnect the spindle nut 32 from the housing 22 in a torque-free manner if a defined overload torque which acts between the spindle nut 32 and the housing 22 is exceeded. When an overload torque is reached, which, in the press 10 shown in FIG. 1, can occur when a maximum pressing force exerted on the workpiece 16 is exceeded for example, the overload clutch 34 therefore disengages. Damage to the spindle drive 30 and to the drive motor 20 can thereby be prevented. Moreover, the maximum pressing force desired can be defined not only by means of the motor torque but also by means of the corresponding design of the overload clutch 34.

The overload clutch 34 is integrated into the housing 22 of the spindle drive 30. The housing 22 surrounds not only the spindle nut 32 but also the overload clutch 34. Conversely, the spindle nut 32 also acts as part of the overload clutch 34. It is thereby possible to achieve a very compact construction of the spindle drive 30 together with the overload clutch 34.

The spindle drive 30 furthermore comprises an axial bearing 36. This axial bearing 36 is used to support the spindle nut 32 axially in the housing 22. In the present case, "axially" is interpreted to mean the direction parallel to the longitudinal axis 38 of the spindle 24. The axial bearing 36 is arranged between an end face of the housing 22, said end face extending perpendicularly to the longitudinal axis 38 of the spindle 24, and an end of the spindle nut 32, said end likewise extending perpendicularly to the longitudinal axis 38 of the spindle 24. Said end face of the spindle nut 32 is located on a flange 40, which projects radially from the spindle nut 32. In the illustrative embodiment under consideration, the axial bearing 36 is embodied as a deep-groove ball bearing. However, it is self-evident that other types of bearing can be considered for this purpose.

The axial bearing has the task of transmitting the axial forces from the spindle nut 32 to the housing 22. In the normal case, this axial bearing 36 is subject only to static loads since, in normal operation, no relative movement takes place between the spindle nut 32 and the housing 22.

Only when the overload clutch 34 disengages, i.e. when the overload torque is exceeded, does a relative movement (rotation) take place between the housing 22 and the spindle nut 32. In order to ensure this, the axial bearing 36 is designed to allow such a movement of the housing 22 relative to the spindle nut 32 around the longitudinal axis 38. Moreover, the spindle drive 30 comprises a radial bearing 42 for radially supporting the spindle nut 32 in the housing 22. This radial bearing 42 is arranged between an outer side of the flange 40 of the spindle nut 32 and an inner side of the housing 22. In the illustrative embodiment under consideration, the radial bearing 42 is embodied as a sliding bearing. Here too, however, other types of bearing may also be considered. As in the case of the axial bearing 36, there is no movement between the sliding bearing 42 and the spindle nut 32 in the normal operation of the spindle drive 30. As with the axial bearing 36 too, such movement takes place only in the case of the disengagement of the overload clutch 34.

The overload clutch 34 comprises a first clutch component 44, which is connected to the spindle nut 32 for conjoint rotation therewith. Moreover, the overload clutch 34 comprises a second clutch component 46, which is connected to the housing 22 for conjoint rotation therewith. Arranged between the first clutch component 44 and the second clutch component 46 is a plurality of latching elements 48, which allow a relative movement between the two clutch components 44, 46 when the overload clutch 34 disengages. When the overload torque is reached, the latching elements 48 disengage from a latched position and move relative to the first clutch component 44 and/or the second clutch component 46.

In the first embodiment, which is shown in FIGS. 2-7, the two clutch components 44, 46 are designed as latching disks 50, 52. In the present case, they are referred to as the first latching disk 50 and the second latching disk 52. In this embodiment, the latching elements 48 are configured as latching balls 54, which are arranged either in first grooves 56, which are introduced into the first latching disk 50, or in second grooves 58, which are introduced into the second latching disk 52. In the radial direction and in the circumferential direction, the latching balls 54 are held by a massive cage 60, which comprises a plurality of sockets 62, each intended to receive one latching ball 54. Accordingly, this cage 60 is likewise arranged between the first latching disk 50 and the second latching disk 52.

The latching elements 48 or latching balls 54 act as rolling elements when the overload clutch 34 disengages. Instead of latching balls 54, it would also be possible in principle to use cylindrical or conical rolling elements. If, as in the present case, latching balls 54 are used for power transmission, the force or torque is transmitted pointwise. In the case of cylindrical or conical latching elements 48, in contrast, the force or torque would be transmitted in a linear manner.

The grooves 56, 58 are of concave design. They can be embodied either as linear, i.e. rectilinear grooves, or, in the simplest case, as holes. The grooves 56, 58 assume the guidance of the latching balls 54 in the circumferential direction. Thus, torque transmission between the housing 22 and the spindle nut 32 is accomplished by means of the forces transmitted by means of the overload clutch 34 and acting in the circumferential direction. Here, the force flow is as follows: the driving force exerted by the motor 20 is introduced into the housing 22. From there, the force is transmitted via the second latching disk 52, via the second grooves 58, to the latching balls 54 arranged in the second grooves 58. The latching balls 58 arranged in the second grooves 58 transmit the force via the cage 60 to the latching balls 54, which are arranged in the first grooves 56 of the first latching disk 50. From there, the force is introduced via the first grooves 56 to the first latching disk 50, with the result that the force is ultimately transmitted via the first latching disk 50 to the spindle nut 32.

In the first embodiment shown in FIGS. 2-7, the first latching disk 50 is connected to the spindle nut 32 by means of a plurality of driver pins 64. The driver pins 64 each project into a fastening hole, which is provided in the flange 40 of the spindle nut 32. Since the shape and positional tolerances of the fastening holes provided in the flange 40 are not suitable for precise and play-free reception of the driver pins 64, the driver pins 64 are made deliberately smaller, thus enabling them to penetrate into the fastening holes in the flange 40 of the spindle nut 32 without the exertion of a force. In order to achieve firm nonpositive engagement, the fastening holes are then filled with a potting compound. High torque transmission from the first latching disk 50 to the spindle nut 32 is thus ensured. However, it is self-evident that this is only one example of the connection between the first latching disk 50 and the spindle nut 32. In principle, other types of nonpositive, positive or materially integral connections between these two components may also be considered.

The second latching disk 52 is connected to the housing 22 for conjoint rotation therewith. Webs 66 which project radially from the second latching disk 52 (see FIGS. 5 and 7) are arranged in guide grooves 68, which are introduced into the housing 22. The engagement of the webs 66 in the guide grooves 68 gives rise to an anti-rotation safeguard between the second latching disk 52 and the housing 22. The guide grooves 68 are designed to be larger in the axial direction, i.e. parallel to the longitudinal axis 38, of the spindle 24 than the webs 66. The webs 66 and hence also the second latching disk 52 can thus move relative to the housing 22 in the axial direction but are fixed in the circumferential direction.

The possibility of relative movement of the second latching disk 52 in the axial direction is required, in particular, for the disengagement or unlatching of the latching elements 48 from the respective grooves 56, 58, this taking place when the overload torque is reached. The second latching disk 52 is therefore supported relative to the housing 22 by means of one or more spring elements 70. A multiplicity of spring elements 70, which press the latching balls 54 into the first or second grooves 56, 58, is preferably provided. The spring force of the spring elements 70 thus defines not only the preloading force with which the latching balls 54 are pressed into the grooves 56, 58 but hence also the overload torque above which the overload clutch 34 unlatches. The use of a plurality of spring elements 70 ensures that the preloading force which is exerted on the latching balls 54 is introduced as uniformly as possible. Tolerances of individual spring elements 70 can thus be eliminated to the greatest possible extent.

Figure 5:
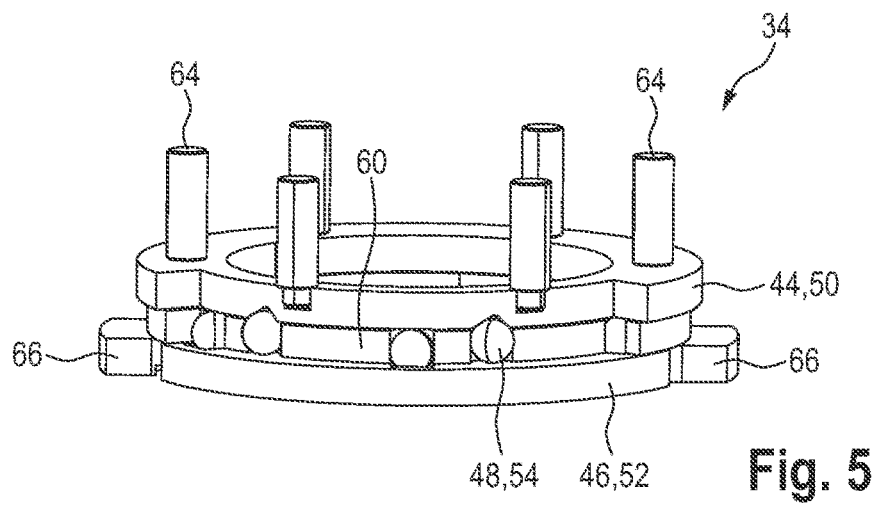
FIG. 5 shows a perspective illustration of an overload clutch which is used in the spindle drive according to the first embodiment, wherein the overload clutch is shown in a latched position.
Figure 6:
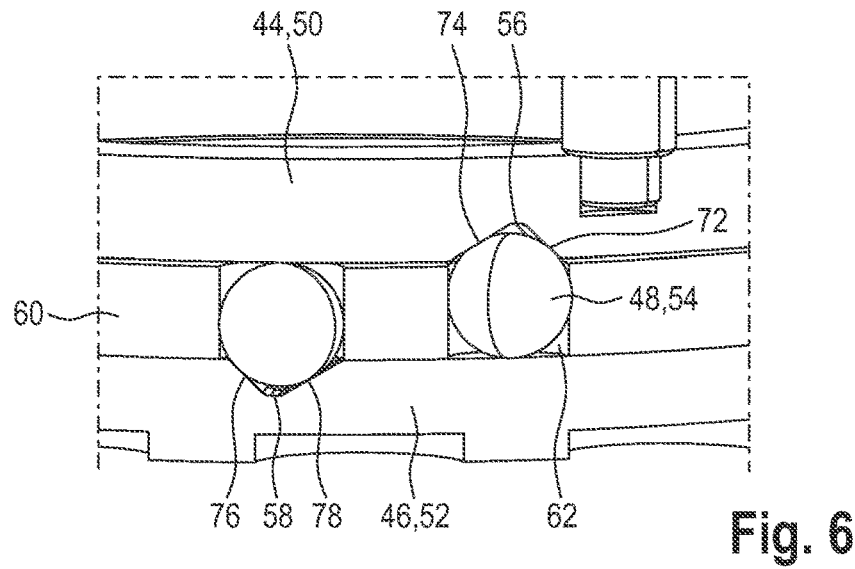
FIG. 6 shows a detail from FIG. 5.
Figure 7:
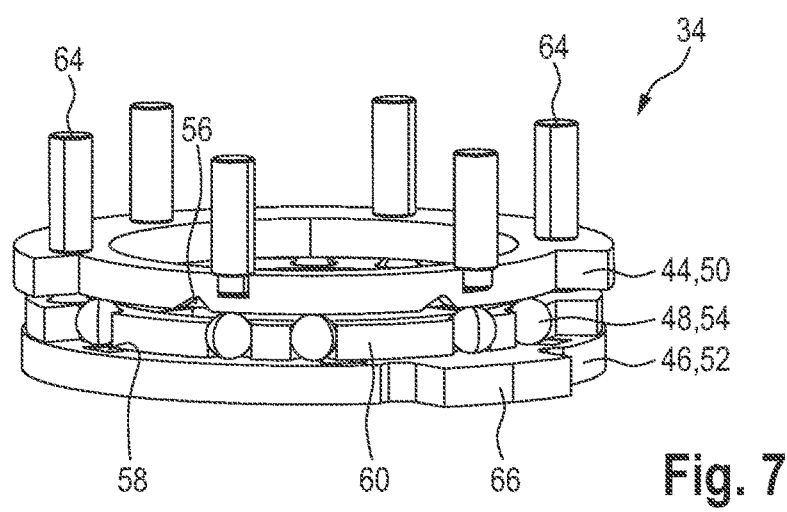
FIG. 7 shows a perspective illustration of the overload clutch from FIG. 5, wherein the overload clutch is shown in a disengaged position.
Figure 8:
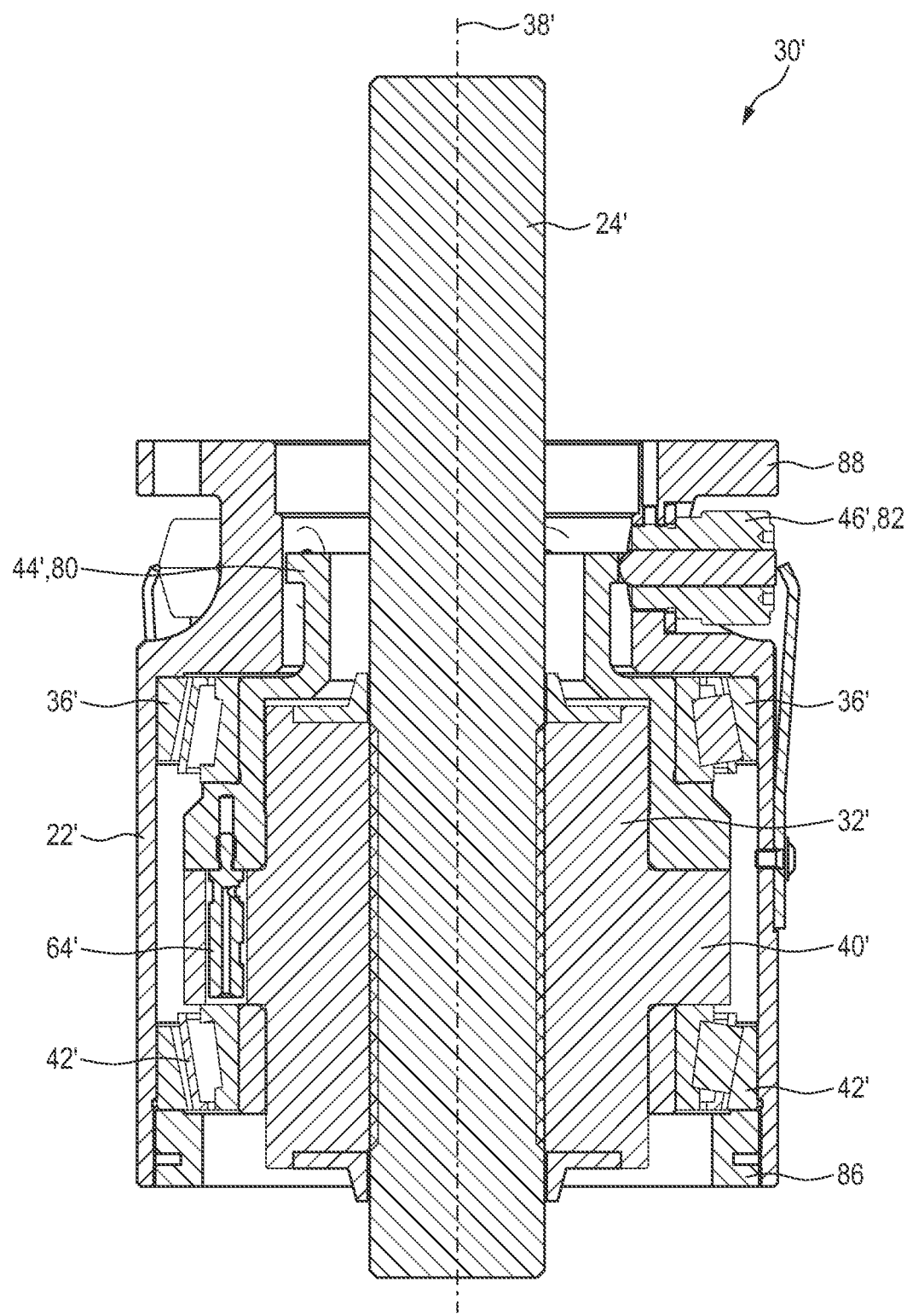
FIG. 8 shows a longitudinal section through a second embodiment of the spindle drive which may be used in the press illustrated in FIG. 1.
Figure 9:
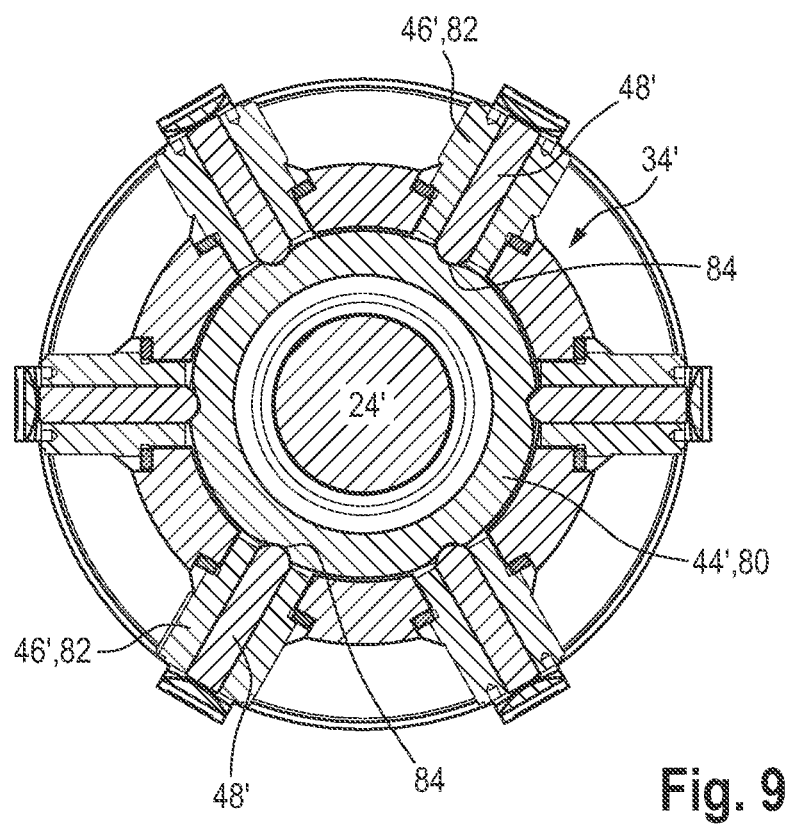
FIG. 9 shows a cross section through the second embodiment of the spindle drive, wherein the overload clutch is shown in the latched position.
Figure 10:
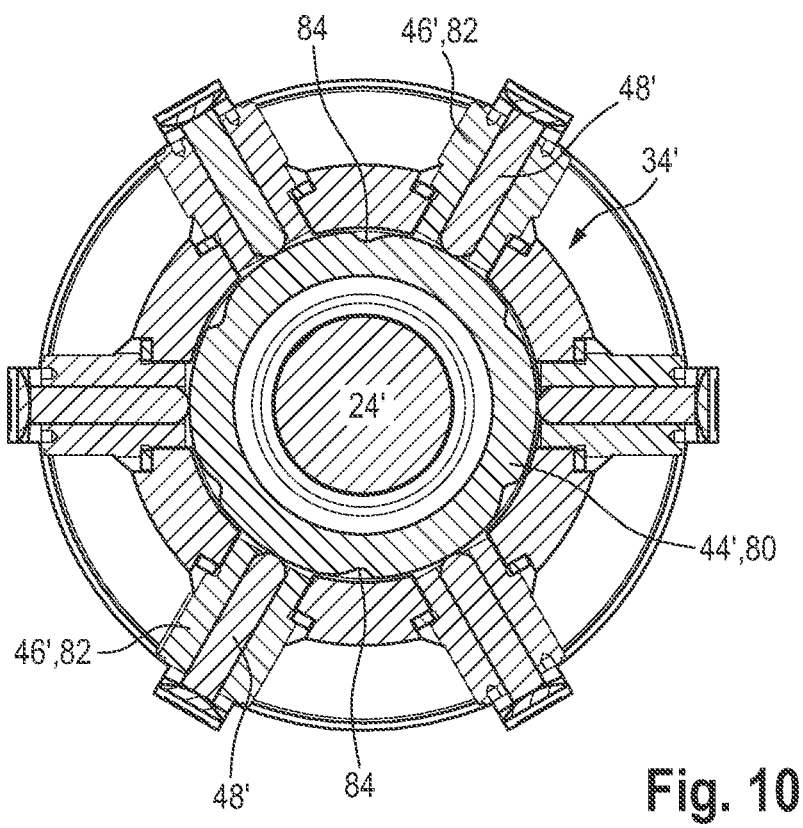
FIG. 10 shows a cross section through the second embodiment of the spindle drive, wherein the overload clutch is shown in a disengaged position.
Figure 11:
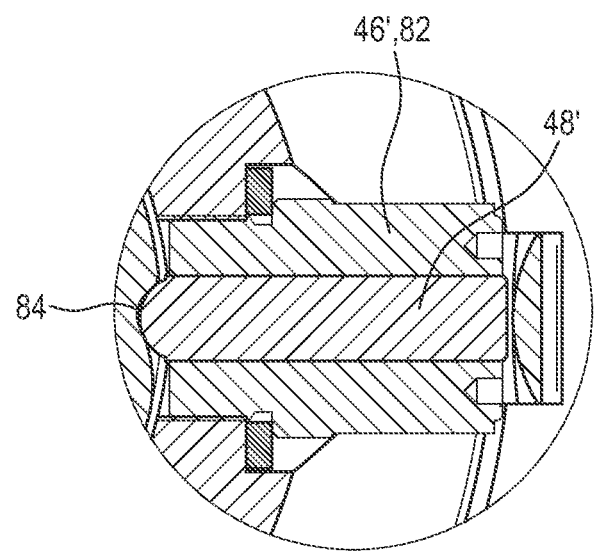
FIG. 11 shows a detail from FIG. 9, which shows the latched position of the latching elements.
Figure 12:
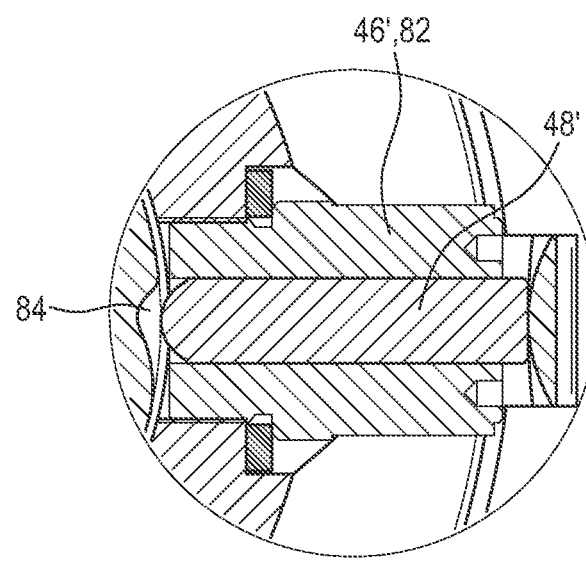
FIG. 12 shows a detail like that in FIG. 9, wherein the latching elements are shown in their disengaged position.

The individual components of the overload clutch 34 can be seen in detail in FIGS. 5-7. Parts of the first latching disk 50 and of the cage 60 are illustrated in section in FIGS. 5-7 in order to make the latching balls 54 visible. FIG. 5 shows the latched position of the overload clutch 34, i.e. the normal case, during which the latching balls 54 are arranged in the first and second grooves 56, 58 and a torque can be transmitted from the second latching disk 52 to the first latching disk 50. FIG. 6 shows a detail from FIG. 5. In contrast, FIG. 7 shows the disengaged state of the overload clutch 34, in which the latching balls 54 are disengaged from the first and second grooves 56, 58 and thus torque is no longer being transmitted between the second latching disk 52 and the first latching disk 50. In this state, the torque of the drive motor 20 is decoupled from the spindle nut 32, apart from the friction which arises within the bearings 36, 42. The latching balls 54 are situated outside the grooves 56, 58 and roll on the smooth running surfaces of the two latching disks 50, 52. The rolling of the latching balls 54 is made possible by the axial bearing 36 and the radial bearing 42. Owing to the efficiency of the spindle drive 30, the rolling friction of the latching balls 54 is overcome.

In the disengaged state of the overload clutch 34, the latching balls 54 run on the flat running surfaces of the two latching disks 50, 52 until they fall back into the grooves 56, 58. In the case where the drive motor 20 has not yet come to a halt and the drive torque continues to exceed the overload torque, the overload clutch 34 disengages again. When the drive motor 20 is stationary, a reverse movement can be introduced. During this process, the latching balls 54 latch into corresponding first grooves 56 of the first latching disk 50 and the second grooves 58 of the second latching disk 52. The spindle 24 can then be moved away from the stop-contact position.

When the spindle drive 30 is used in the press 10 shown in FIG. 1, a high pressing force is generally required in a direction of movement of the spindle 24 (toward the workpiece 16). This pressing force can be limited in a defined manner by the overload clutch 34. During the return stroke, however, there is generally a desire for disengagement of the overload clutch 34 to take place at a significantly lower force.

The different disengagement forces can be achieved very simply through the configuration of the groove flanks 72, 74 and 76, 78 of the first and second grooves 56 and 58, respectively. The disengagement force can be reduced by means of a shallower groove flank. In contrast, a steeper groove flank increases the disengagement force. The groove flanks 72 of the first grooves 56 slope more steeply than the opposite groove flanks 74, for example. In exactly the same way, the groove flanks 76 of the second grooves 58 slope more steeply than the opposite groove flanks 78 of the second grooves 58 (see FIG. 6).

It can furthermore be seen in FIGS. 5-7 that, in this embodiment, twice as many latching balls 54 are used as first grooves 56 or second grooves 58. Each latching ball 54 is therefore arranged either in one of the first grooves 56 provided in the first latching disk 50 or in one of the second grooves 58 provided in the second latching disk 52. This reduces the necessary spring travel of the spring elements 70 during the disengagement of the overload clutch 34. The disengagement force can therefore be chosen with narrower tolerances. Moreover, this solution is subject to less wear than with overload clutches in which the latching balls are each arranged not only in one but in two grooves (both in the first latching disk and in the second latching disk).

FIGS. 8-12 show a second embodiment of the spindle drive, which is therein denoted by the reference numeral 30'. For the sake of simplicity, only the significant differences with respect to the first embodiment are explained below. The basic principle of the spindle drive with an integrated overload clutch remains the same, and therefore this will not be explored again below. Identical or corresponding components are denoted by the same reference numerals in FIGS. 8-12 as in FIGS. 2-7, but with a prime symbol.

A difference of the second embodiment consists in the type of embodiment of the overload clutch 34'. Here, the second clutch component 46' is not configured as a latching disk but comprises a plurality of holders 82, in each of which a latching element 48' is resiliently mounted. The latching elements 48' are of substantially bar-shaped configuration. The holders 82 are arranged in the housing 22' in such a way that the latching elements 48' are movable in the radial direction, i.e. perpendicularly to the longitudinal axis 38' of the spindle 24'.

In the second embodiment, the first clutch component 44' is configured as a sleeve 80, which surrounds the spindle nut 32' or is placed on the latter. The sleeve 80 comprises a plurality of grooves 84, in which the rod-shaped latching elements 48' engage in the latched position (see FIG. 9).

In a similar or identical way to the first embodiment, the sleeve 80 which forms the first clutch component 44' is connected to the spindle nut 32' for conjoint rotation therewith. The holders 82 which form the second clutch component 46' are connected to the housing 22' for conjoint rotation therewith. As long as the latching elements 48' are arranged in the latched position in the grooves 84, there is no relative movement between the two clutch components 44', 46' and hence also no relative movement between the spindle nut 32' and the housing 22'. When the overload torque is exceeded, on the other hand, the latching elements 48' disengage from the grooves 84, and therefore there is no longer nonpositive engagement between the latching elements 48' and the sleeve 80. The housing 22' can then rotate relative to the spindle nut 32'. The drive motor 20 is thus decoupled from the spindle nut 32'.

As long as the drive torque of the drive motor 20 exceeds the overload torque, the latching elements 48' pass over the grooves 84 without latching into said grooves. On the other hand, if the drive torque of the drive motor 20 is reduced to a value below the overload torque, the latching elements 48' automatically latch back into the respective grooves 84, with the result that the housing 22' and the spindle nut 32' then rotate synchronously once again and the driving force of the drive motor 20 is transmitted to the spindle nut 32'.

In a manner similar to the first embodiment too, the overload torque can be regulated both by the spring forces with which the latching elements 48' are pressed into the grooves 84 and by the shaping of the grooves 84 and/or latching elements 48'. Here too, the slopes of the groove flanks of the grooves 84 can differ in order to achieve the abovementioned effect of different axial forces in the opposite directions of rotation.

The manner in which the first clutch component 44' (sleeve 80) is connected to the spindle nut 32' and the support of the spindle nut 32' within the housing 22' is likewise of similar configuration to that in the first embodiment. The spindle nut 32', which, here too, is provided with a radially projecting flange 40', is connected to the sleeve 80 via driver pins 64'. One end of each of the driver pins 64' is screwed into the sleeve 80. The opposite end of each of the driver pins 64 is arranged in a hole, which is provided in the flange 40' of the spindle nut 32'. The cavities between the respective holes and the driver pins 64' are preferably filled with a potting compound. However, attention is drawn to the fact that a large number of other methods of connection (nonpositive, positive or materially integral) between the sleeve 80 and the spindle nut 32 is possible.

The spindle nut 32' is supported within the housing 22' via two bearings 36', 42', which are both designed as rolling bearings in the embodiment under consideration and which support the spindle nut 32' both radially and axially within the housing 22'. A threaded ring 86, which is screwed to the housing 22' on the underside of the housing 22', produces a preload, which acts on the inner part of the spindle drive 30', which includes the bearings 36', 42', the sleeve 80 and the spindle nut 32'.

A "hollow shaft adapter" 88, which serves to provide a connection between the spindle drive 30' and the drive motor 20, is provided on the upper side of the housing 22'.

In summary, it can therefore be stated that the spindle drive 30, 30' provides a possibility of connecting a spindle nut 32, 32' to a drive motor 20 via an overload clutch 34, 34' which is integrated directly into the spindle drive 30, 30'. A characteristic here is the relatively small overall length of the unit formed by the spindle nut 32, 32', the overload clutch 34, 34' and the housing 22, 22', said length being only insignificantly greater than the overall length of the spindle nut 32, 32' itself. Another advantage of the spindle drive 30, 30' consists in that the mass moment of inertia is reduced to a minimum by virtue of the design solution indicated. This allows high angular accelerations of the drive motor 20.

The spindle nut 32, 32', which is preferably provided with a radially projecting flange 40, 40', is a component part of the highly integrated design solution of the overload clutch 34, 34'. The overload clutch 34, 34' can transmit axial forces with a high rigidity. By virtue of the asymmetric shaping of the grooves 56, 58, 84, different disengagement torques can be provided for the two opposite directions of rotation. The use of low-friction radial and axial bearings ensures automatic engagement of the overload clutch 34, 34' during the return stroke or when the motor speed is reduced. Additional measures to reestablish the latched position can be omitted.

The spindle nut 32, 32' and the spindle 24, 24' do not necessarily have to be provided with threads, as shown in the embodiments. It is also possible, for example, for the spindle system to be designed as a recirculating ball screw or as a roller screw drive without exceeding the spirit and scope of the present disclosure.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A press, comprising:
   a motor;
   a spindle drive having a spindle defining a longitudinal axis and a spindle nut which is threadingly mounted on the spindle;
   a housing which surrounds the spindle nut; and
   an overload clutch which is arranged in the housing;
   wherein the motor is configured to drive the housing in rotation,
   wherein the spindle nut and the housing are connected to one another via the overload clutch to allow a torque transmission from the housing via the overload clutch to the spindle nut if a defined overload torque acting between the spindle nut and the housing is not exceeded, so that a rotary motion of the housing driven by the motor causes a rotary motion of the spindle nut which in turn causes a translational motion of the spindle along the longitudinal axis, and
   wherein the overload clutch is configured to disconnect the torque transmission if the defined overload torque acting between the spindle nut and the housing is exceeded.

2. The press as claimed in claim 1, wherein the motor comprises a hollow shaft which is driven in rotation, wherein the housing is arranged on the hollow shaft and connected thereto for a conjoint rotation with the hollow shaft.

3. The press as claimed in claim 1, further comprising a radial bearing which is configured to radially support the spindle nut in the housing and an axial bearing which is configured to axially support the spindle nut in the housing.

4. The press as claimed in claim 3, wherein the radial bearing and the axial bearing are arranged between the spindle nut and the housing.

5. The press as claimed in claim 1, wherein the overload clutch comprises a first clutch component which is connected to the spindle nut for conjoint rotation therewith, a second clutch component which is connected to the housing for conjoint rotation therewith, and a number of latching elements which are arranged between the first and the second clutch component and which unlatch from a latched position through a movement relative to the first and/or the second clutch component when the overload torque is reached.

6. The press as claimed in claim 5, wherein the first clutch component comprises a first latching disk having a number of first grooves, wherein the second clutch component comprises a second latching disk having a number of second grooves, and wherein in the latched position a first one of the latching elements is arranged in one of the first grooves and a second one of the latching elements is arranged in one of the second grooves.

7. The press as claimed in claim 6, wherein the number of first grooves equals the number of second grooves, and wherein the number of latching elements is twice the number of first grooves.

8. The press as claimed in claim 6, wherein each of the first grooves and the second grooves have an asymmetric configuration and mutually opposite groove flanks having different slopes.

9. The press as claimed in claim 6, wherein the spindle defines a longitudinal axis, and wherein the second latching disk is mounted in the housing so as to be resilient in an axial direction which is parallel to the longitudinal axis of the spindle.

10. The press as claimed in claim 5, wherein the second clutch component comprises a plurality of holders, wherein one of the number of latching elements is resiliently mounted in each of the plurality of holders, and wherein the first clutch component comprises a plurality of grooves into which the latching elements engage in the latched position.

11. The press as claimed in claim 10, wherein the spindle defines a longitudinal axis, and wherein the latching elements are movable relative to the plurality of holders in a radial direction which is perpendicularly to the longitudinal axis of the spindle.

12. The press as claimed in claim 10, wherein the first clutch component is configured as a sleeve which at least partially surrounds the spindle nut, and wherein the sleeve is connected to the spindle nut for conjoint rotation.

13. A press, comprising:
- a motor;
- a spindle drive having a spindle and a spindle nut which is arranged on the spindle;
- a housing which surrounds the spindle nut; and
- an overload clutch which is arranged in the housing;
- wherein the motor is configured to drive the housing in rotation,
- wherein the spindle nut and the housing are connected to one another via the overload clutch to allow a torque transmission from the housing via the overload clutch to the spindle nut if a defined overload torque acting between the spindle nut and the housing is not exceeded,
- wherein the overload clutch is configured to disconnect the torque transmission if the defined overload torque acting between the spindle nut and the housing is exceeded,
- wherein the overload clutch comprises a first clutch component which is connected to the spindle nut for conjoint rotation therewith, a second clutch component which is connected to the housing for conjoint rotation therewith, and a number of latching elements which are arranged between the first and the second clutch component and which unlatch from a latched position through a movement relative to the first and/or the second clutch component when the overload torque is reached,
- wherein the first clutch component comprises a first latching disk having a number of first grooves, wherein the second clutch component comprises a second latching disk having a number of second grooves, and wherein in the latched position a first one of the latching elements is arranged in one of the first grooves and a second one of the latching elements is arranged in one of the second grooves, and
- wherein the spindle defines a longitudinal axis, wherein the housing comprises a plurality of guide grooves, wherein into each of the plurality of guide grooves there engages a web which is connected to the second latching disk and projects radially therefrom, wherein the webs are each movable in an axial direction which is parallel to the longitudinal axis of the spindle, and wherein the webs are each fixed in a circumferential direction in the guide grooves, the circumferential direction being perpendicular to the axial direction.

\* \* \* \* \*